United States Patent
Ding

(10) Patent No.: US 8,671,161 B2
(45) Date of Patent: Mar. 11, 2014

(54) METHOD FOR REALIZING USER REGISTRATION

(75) Inventor: Zhaoming Ding, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 221 days.

(21) Appl. No.: 12/935,087

(22) PCT Filed: Dec. 29, 2008

(86) PCT No.: PCT/CN2008/073820
§ 371 (c)(1),
(2), (4) Date: Sep. 28, 2010

(87) PCT Pub. No.: WO2009/124445
PCT Pub. Date: Oct. 15, 2009

(65) Prior Publication Data
US 2011/0022686 A1  Jan. 27, 2011

(30) Foreign Application Priority Data
Apr. 11, 2008  (CN) .......................... 2008 1 0089966

(51) Int. Cl.
| | |
|---|---|
| G06F 15/16 | (2006.01) |
| H04M 1/66 | (2006.01) |
| H04M 11/04 | (2006.01) |
| H04W 36/00 | (2009.01) |
| H04W 24/00 | (2009.01) |
| H04L 12/16 | (2006.01) |
| H04W 4/00 | (2009.01) |
| H04J 3/16 | (2006.01) |
| G06F 7/04 | (2006.01) |

(52) U.S. Cl.
USPC ........... 709/219; 455/436; 455/411; 455/433; 455/404.1; 455/456.1; 370/259; 370/328; 370/338; 370/465; 726/3

(58) Field of Classification Search
None
See application file for complete search history.

(56) References Cited

U.S. PATENT DOCUMENTS 6,654,606 B1 * 11/2003 Foti et al. ................... 455/432.1
7,383,044 B2 * 6/2008 Bleckert et al. ............... 455/433

(Continued)

FOREIGN PATENT DOCUMENTS

| CN | 1852593 A | 10/2006 |
| CN | 1859776 A | 11/2006 |
| CN | 101052212 A | 10/2007 |

OTHER PUBLICATIONS

Request for Comments: 4662, Aug. 2006.*

(Continued)

*Primary Examiner* — Saleh Najjar
*Assistant Examiner* — Oleg Korsak
(74) *Attorney, Agent, or Firm* — Banner & Witcoff, Ltd.

(57) ABSTRACT

A method for implementing user registration based on Diameter network protocol comprises: after receiving a network attaching request of a user, a requesting node sending an Update Location Request (ULR) message to HSS of the user, the message including information indicating whether it is necessary to download user subscription data, and also includes information indicating the capability of the requesting node when the downloading is necessary; upon receiving the ULR message, the HSS of the user returning an Update Location Ack message to the requesting node if the check of the user is passed; if the ULR message indicates that it is necessary to download the user subscription data, HSS determining the user subscription data supported by the requesting node according to the information indicating the capability of the requesting node, and including the user subscription data in the Update Location Ack message and then returning it to the requesting node.

5 Claims, 2 Drawing Sheets

(56) References Cited

U.S. PATENT DOCUMENTS

| | | | |
|---|---|---|---|
| 7,469,145 B2 * | 12/2008 | Li | 455/450 |
| 7,502,837 B2 * | 3/2009 | Westman et al. | 709/219 |
| 7,684,795 B2 * | 3/2010 | Salmivalli et al. | 455/433 |
| 7,693,506 B1 * | 4/2010 | Back et al. | 455/432.1 |
| 7,783,279 B2 * | 8/2010 | Ramanathan et al. | 455/404.1 |
| 8,165,063 B2 * | 4/2012 | Kim et al. | 370/328 |
| 2007/0293241 A1 | 12/2007 | Tamura | |

OTHER PUBLICATIONS

ETS 300 513, Sep. 1994.*

International Search Report for PCT/CN2008/073820 dated Mar. 23, 2009.

* cited by examiner

METHOD FOR REALIZING USER REGISTRATION

TECHNICAL FIELD

The present invention relates to the field of mobile communication, and in particular, to a method for implementing user registration based on Diameter network protocol.

BACKGROUND OF THE INVENTION

With increasing emergence of new techniques, 3GPP (3$^{rd}$ Generation Partnership Project) should consider how to keep its technical leading predominance in the field of mobile communication in the future ten years and to provide satisfactory supports for increasing requirements of operators and subscribers through sustaining evolvement and enhancement from wireless interface to core network in system architecture evolvement of the future mobile communication field. The evolution program of packet switched domain core network facing all IPs (System Architecture Evolution, SAE), which is now called as EPS (Evolved Packet System) is just originated under this background. The purpose of SAE is to "establish a 3GPP system frame structure with portability characterized in high data rate, low delay, data packetization and supporting a plurality of wireless access techniques".

A SAE network has features including supporting end-to-end QoS (Quality of Service) assurance, all-around packetization, supporting multi-access technique, increase of supports for real-time services, network hierarchy flattening, etc. The SAE network further achieves separation of control plane data from user plane data, and a new network element of MME (Mobility Management Entity) has functions such as supporting roaming, authentication and bearing management as a network function entity for carrying user data on the control plane. The S6a interface between MME and HSS (Home Subscriber Server), as shown in FIG. 1, provides downloads of user data, authentication data, etc.

After initially accessing a network via different access networks, a user is required to register the location information of the user access point to its HSS before using network resources, and the HSS checks validity of the user. For a valid user, the HSS determines according to user subscription data whether to allow the user to use the network resources, and if the user is allowed to use the network resources, then related data information of the user (e.g., user subscription data, etc) is downloaded to the visited network where the user is located; for an invalid user, the HSS refuses the user using the network resources. Such a process is called as user registration, which mainly includes user location information registration and user data downloading process (if the user initially registers at the network or the user data stored in the access network are not reliable, and the like).

FIG. 2 is a flow chart of a user registering to the user's HLR (Home Location Register) through a SGSN (Service GPRS Supporting Node, which is a network element responsible for mobility management at the core network side) network node in accessing ways such as UTRAN (Universal Terrestrial Radio Access Network) or UMTS (Universal Mobile Telecommunication System), etc. in a packet switched domain. The Gr interface between a SGSN and a HLR is based on MAP network protocol, and the flow of user registration comprises the following steps:

Step 201, a user originating a network attaching request through an access network;

Step 202, a SGSN receiving the network attaching request of the user and detecting that the user is initially attached to the network and the MME has no user data information, the SGSN configuring a user subscription data downloading indicator and originating an Update Location Request (ULR) message based on MAP network protocol to the user's HLR, wherein the request message carries the user subscription data downloading indicator;

Step 203, the user's HLR checking the user, and triggering downloading of user data according to the user subscription data downloading indicator, if it is not necessary to download user data, then skipping step 204 and step 205 and directly returning an Update Location Ack message; if it is necessary to download user data, then executing step 204 and step 205 to download user data, wherein the process of downloading user data may be executed for a plurality of times;

Step 204, the HLR sending a data inserting request message to the SGSN, wherein the message includes information such as user subscription data;

Step 205, the SGSN checking user data and returning an data inserting ack message to the HLR, wherein the ack message includes subscription data that are not supported by the SGSN and the like;

Step 206, after receiving the data inserting ack message, the HLR executing a further action according to the result of data check, for example, restoring service data and the like; if user data are downloaded successfully, the HLR stores location information of user registration and returns an Update Location Ack message of success to the SGSN;

With the above steps, the process of user registration based on MAP network protocol between SGSN and HLR is completed, wherein step 202 and step 206 complete registration of user location information, step 204 and step 205 complete downloading of user data and verification/negotiation, so registration of user location information and download of user data and verification/negotiation are completed in one session.

FIG. 3 is a flow chart of a user registering to a HSS in an IP multimedia domain. FIG. 3 only describes the flow of user re-registration in order to describe user registration briefly, wherein I-CSCF (Interrogation Call Session Control Function) and S-CSCF (Serving Call Session Control Function) are two network elements used for session control in an IP multimedia domain and are access point of a core network and a service control point of user session respectively. The interface between I-CSCF and S-CSCF is based on SIP (Session Initial Protocol) network protocol, and the Cx interface between I-CSCF, S-CSCF and HSS is based on Diameter network protocol. The flow comprises the following steps:

Step 301, an I-CSCF receiving a SIP registration request from a visited network, knowing the user's HSS by inquiry, and then transmitting a user authorization request to the HSS;

Step 302, after receiving the user authorization request from the I-CSCF, the HSS directly returning name of a S-CSCF if it knows by inquiry that the user has registered at the S-CSCF;

Step 303, the HSS returning a user authorization ack message to the I-CSCF, wherein the ack message includes the name of the S-CSCF;

Step 304, the I-CSCF forwarding the SIP registration request to the S-CSCF;

Step 305, the S-CSCF processing the SIP registration request, transmitting a server allocating request to the HSS, and registering the user's location information and requesting to download user data;

Step 306, after receiving the server allocating request, the HSS checking whether the S-CSCF name is consistent with the stored S-CSCF name, allowing the user to register if it is, and returning a server allocating ack message for success, wherein the ack message includes the user data requested to download;

Step 307, the S-CSCF returning 200OK to the I-CSCF.

With the above steps, the user completes the process of registering in an IP multimedia domain, which involves a plurality of network elements, registration of location information and downloading of user data involved in user registration are completed in step 305 and step 306. With respect to implementation of a user registering to a HLR through a SGSN in a packet switched domain, the difference is that there is no process of negotiating on check result of user data between S-CSCF and HSS.

The user needs to implement user registration at the user's HSS via MME network node when the user intends to access a network in E-UTRAN (Evolved-UTRAN) accessing way in a packet switched domain. Function of a MME is similar to that of a SGSN, and the MME is a network node in a control plane which is mainly responsible for mobility management of a user in an EPS network. At present, it is definite that the S6a interface between a MME and a HSS adopts Diameter protocol, and processes of user registration vary in view of different data storage and data management of user data in different network domains. Since function of a MME is similar to that of a SGSN and incorporation of a MME network element is mainly based on evolvement of a packet switched domain, the functions completed in user registration between MME and HSS are similar to those completed in user registration between SGSN and HLR, i.e., not only registration of user location information but also downloading of user data and verification/negotiation of user data shall be completed.

However, implementation of user registration process based on MAP (Mobile Application part) network protocol cannot be totally mapped to a Diameter network protocol mainly due to the reason that the user session state machine in Diameter network protocol and that in MAP network protocol are different from each other. IETF (Internet Engineering Task Force) specifies that Diameter protocol must support Diameter basic protocol, in other words, S6a interface protocol must also comply with the state machines of client and server required by user session defined in Diameter basic protocol.

Diameter user session specifies that server may or may not be in session maintaining state. No matter it maintains session state or not, the working mechanism of a Diameter user session state machine is different from that of a MAP user session state machine. A MAP user session state machine allows a plurality of interactive requests to be originated between equivalent ends after a session is established, i.e., after receiving a session request from an equivalent end, a local end is allowed to transmit a session request to the equivalent end again during establishment of a session, and may returns a session response to the equivalent end after receiving a session response from the equivalent end. A Diameter user session state machine does not allow a client machine to receive requests from a server after the session is turned on, except a request for terminating the session, and only allows it to process acknowledgement messages from the server.

With the aid of a session state machine provided by MAP protocol, when a user registers in a visited domain network, its home domain network can implement capability information negotiation with the visited domain network. For example, when the user home domain network receives a user registration request message, it inserts user data into the visited domain network, and if insertion of user data fails, it returns a data insertion failure message, the user's home domain network forbids the user to register and returns a response message of registration failure to the visited domain network in which the user roams. If Diameter protocol is used, the HSS of the user's home domain network can only return a registration response message when receiving a user registration request message and user registration is considered as successful when a message of successful registration is returned.

Registration of a SGSN to a HLR based on MAP protocol includes registration of location information and downloading of user data as well as a process of data verification/negotiation, but this process requires a plurality of signaling interactions. IMS registration based on Diameter protocol, registration between S-CSCF and HSS only need one signaling interaction to implement registration of location information and downloading of user data, but lack the process of data verification/negotiation since HSS believes that the capability of S-CSCF selected by I-CSCF supports all user data, therefore the process of data verification/negotiation is not required.

To sum up, the problems of the prior art are as follows: the process of user registration implemented based on MAP network protocol in a packet switched domain cannot be used to implement user registration between MME and HSS based on Diameter network protocol in packet switched domain evolvement, and the existing flow of user registration implemented based on Diameter network protocol also does not apply to user registration between MME and HSS.

SUMMARY OF INVENTION

The technical problem to be solved in the present invention is to provide a method for implementing user registration to solve the problem in the prior art that the existing flow of user registration cannot solve the problem of user registration between a network node and HSS in a packet switched domain, thereby implementing user registration based on Diameter network protocol.

In order to solve the above problem, the present invention provides a method for implementing user registration, and the method is based on Diameter network protocol, and comprises:

after receiving a network attaching request of a user, a requesting node sending an Update Location Request message to a Home Subscriber Server (HSS) of the user, wherein the message includes information indicating whether it is necessary to download user subscription data, and also includes information indicating capability of the requesting node when the downloading is necessary; and upon receiving the Update Location Request message, the HSS of the user returning an Update Location Ack message to the requesting node if the check of the user is passed; if the Update Location Request message indicates that it is necessary to download user subscription data, the HSS determining the user subscription data supported by the requesting node according to the information indicating the capability of the requesting node, and including the user subscription data in the Update Location Ack message to be returned to the requesting node.

Furthermore, the above method may also have the following features:

the information indicating capability of the requesting node refers to:

whether the Update Location Request message carries capability information of the requesting node;

when the requesting node does not support all user subscription data, the Update Location Request message transmitted to the HSS by the requesting node carries capability information of the requesting node; when the requesting node supports all user subscription data, the Update Location Request message transmitted to the HSS by the requesting node does not carry capability information of the requesting node.

Furthermore, the above method may also have the following feature:

the capability information of the requesting node refers to an assemble of features of services supported by the node, including Operator Data Barring (ODB) data, and regional subscription data.

Furthermore, the above method may also have the following feature:

the information indicating whether it is necessary to download user subscription data is a user subscription data downloading indicator.

Furthermore, the above method may also have the following feature:

after the requesting node receives the network attaching request of the user, the method further comprises:

the requesting node detecting location information registered by the user and user data information, judging whether to download user subscription data according to a detection result, and correspondingly configuring a user subscription data downloading indicator.

Furthermore, the above method may have the following feature:

if the user subscription data downloading indicator in the Update Location Request message received by the HSS shows that it is not necessary to download user subscription data, then the HSS does not need to return user subscription data to the requesting node.

Furthermore, the above method may have the following features:

if the user subscription data downloading indicator in the Update Location Request message received by the HSS shows that it is necessary to download user subscription data and the Update Location Request message carries capability information of the requesting node, then the HSS determines user subscription data supported by the requesting node according to the capability information of the requesting node and including the user subscription data in an Update Location Ack message to be returned to the requesting node.

Furthermore, the above method may also have the following features:

if the user subscription data downloading indicator in the Update Location Request message received by the HSS shows that it is necessary to download user subscription data and the Update Location Request message does not carry capability information of the requesting node, then the HSS defaults that the requesting node supports all user subscription data, and returns all user subscription data to the requesting node.

Furthermore, the above method may also have the following feature:

if the user subscription data downloading indicator in the Update Location Request message received by the HSS shows that it is necessary to download user subscription data and the Update Location Request message carries capability information of the requesting node, but the requesting node does not support user subscription data which should be supported in view of the HSS, then the HSS includes a processing result of refusal and a cause value thereof in the Update Location Ack message.

Furthermore, the above method may also have the following feature:

the requesting node is a Mobility Management Entity (MME).

Compared with the prior art, the present invention proposes, with regards to a network interface based on Diameter network protocol, realizing registration of user's location information, downloading and verification/negotiation of user data between a network node and a HSS by using one signaling interaction, i.e., by carrying capability information, e.g., user subscription data that are not supported, of a requesting node in a request message, thereby completing user registration.

PREFERRED EMBODIMENTS OF THE INVENTION

The technical scheme of the present invention will be further described in detail below with reference to accompanying drawings and examples.

The main idea of an access requesting node registering to a HSS based on Diameter network protocol according to the present invention is that: only one signaling interaction is required to complete the process of location information registration, downloading of user data and data verification/negotiation, the request message transmitted from a requesting node to a HSS carries capability information of the requesting node, and the HSS downloads supported user data to the requesting node according to the capability information of the requesting node.

Figure 1:
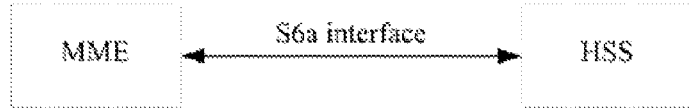
FIG. 1 illustrates an interface between a MME and a HSS.
Figure 2:
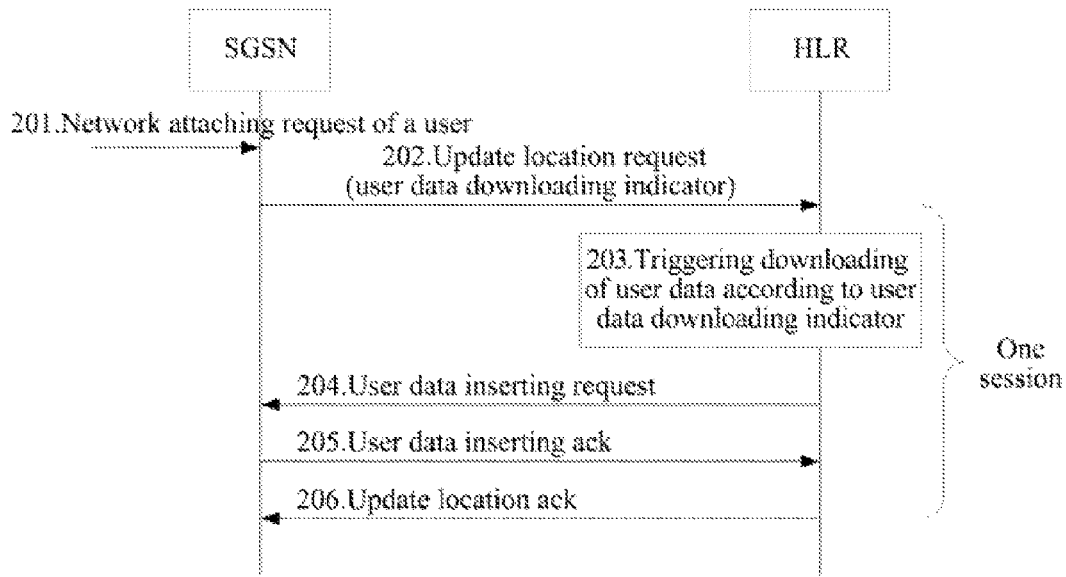
FIG. 2 shows a flow of a user registering to a HLR through a SGSN in a packet switched domain.
Figure 3:
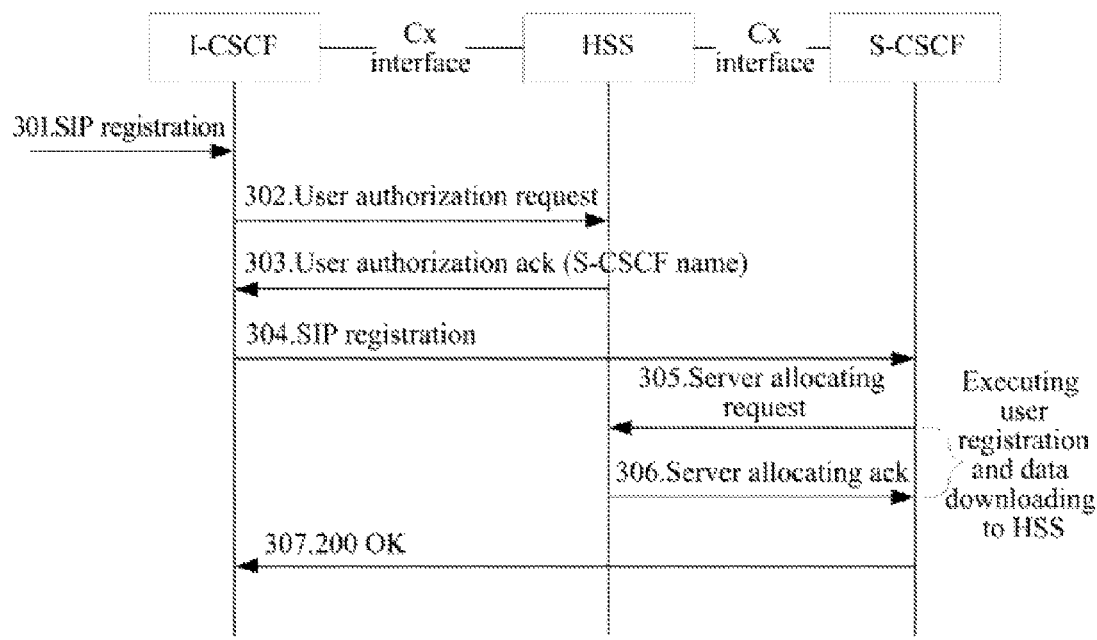
FIG. 3 shows a flow of a user registering to a HSS in an IP multimedia domain.
Figure 4:
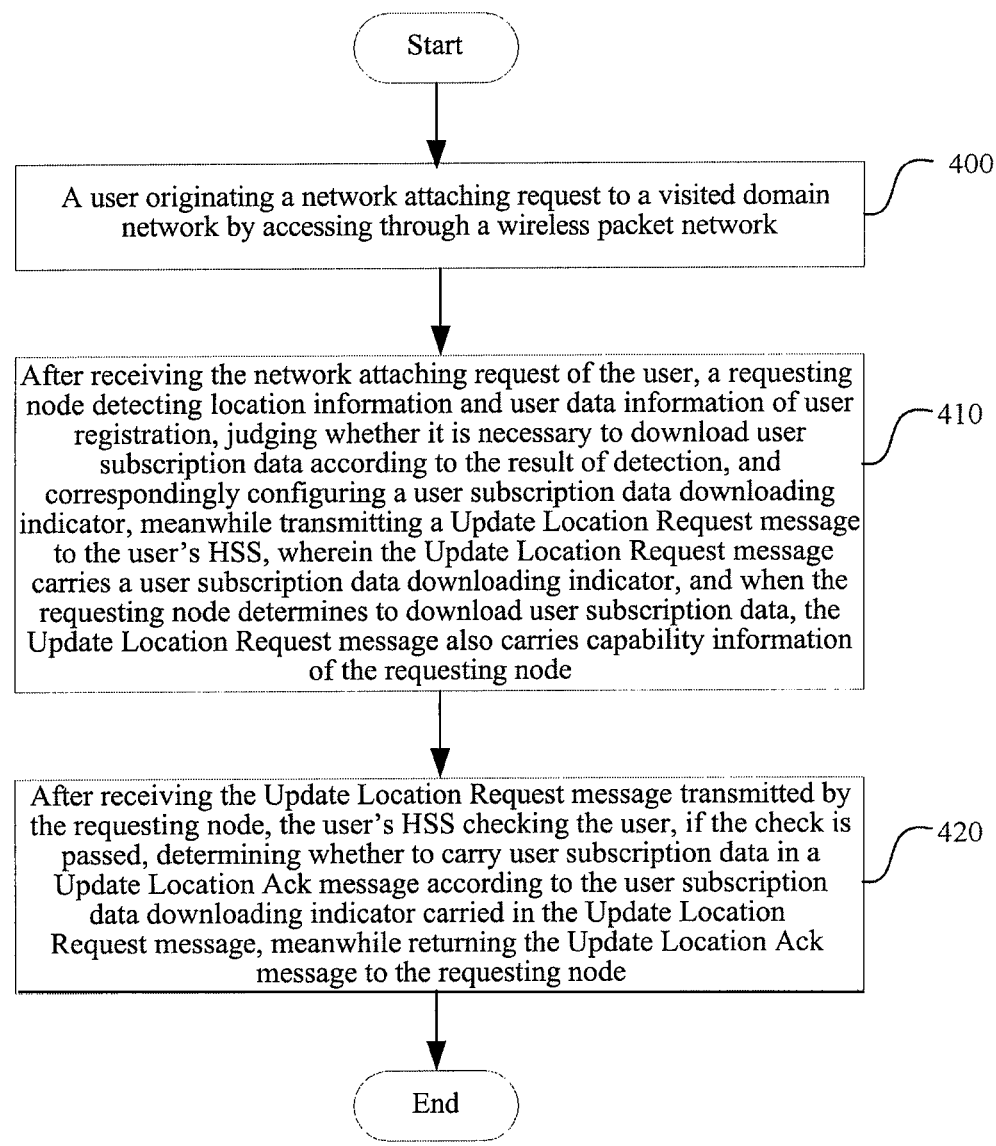
FIG. 4 shows a flow of the method for implementing user registration based on Diameter network protocol according to an example of the present invention.

As shown in FIG. 4, the method for implementing user registration based on Diameter network protocol according to the example of the present invention comprises the following steps:

Step 400, a user originating a network attaching request to a visited domain network by accessing through a wireless packet network;

the wireless packet network refers to, for example, E-UTRAN.

Step 410, after receiving the network attaching request of the user, a requesting node detecting location information and user data information of user registration, judging whether it is necessary to download user subscription data according to the result of detection, and correspondingly configuring a user subscription data downloading indicator, meanwhile transmitting an Update Location Request message to the user's HSS, wherein the Update Location Request message includes a user subscription data downloading indicator, and when it is necessary to download user subscription data, the Update Location Request message also includes information indicating capability of the requesting node.

In practical applications, it is not limited to use a user subscription data downloading indicator as information indicating whether it is necessary to download user subscription data.

The requesting node may refer to a MME.

The information indicating capability of the requesting node may refer to, but not limited to: whether the Update Location Request message carries capability information of the requesting node.

When the requesting node does not support all user subscription data, the Update Location Request message carries capability information of the requesting node; when the requesting node supports all user subscription data, the Update Location Request message does not carry capability information of the requesting node.

The capability information of the requesting node means an assemble of features of services supported by the requesting node; the capability information of the requesting node includes, but not limited to, ODB (Operator Determined Barring) data, and regional subscription data.

Step 420, after receiving the Update Location Request message transmitted by the requesting node, the user's HSS checking the user, if the check is passed, determining whether to carry user subscription data in an Update Location Ack message according to the user subscription data downloading indicator carried in the Update Location Request message, meanwhile returning the Update Location Ack message to the requesting node; if it is indicated that it is necessary to download user subscription data, the HSS determining user subscription data supported by the requesting node according to the information indicating capability of the requesting node, and including the user subscription data in the Update Location Ack message to be returned to the requesting node.

Determining user subscription data supported by the requesting node according to the information indicating capability of the requesting node specifically means: determining user subscription data supported by the requesting node according to whether the Update Location Request message carries capability information of the requesting node and content of the carried capability information of the requesting node, and including the user subscription data in the Update Location Ack message to be returned to the requesting node.

If the user subscription data downloading indicator shows that it is necessary to download user subscription data, then the HSS needs to download user subscription data information to the requesting node.

If the user subscription data downloading indicator shows that it is not necessary to download user subscription data, then the HSS does not need to download user subscription data information to the requesting node.

The user subscription data carried in the Update Location Ack message includes user subscription data supported by the requesting node determined according to the content of the capability information of the requesting node.

If the user subscription data downloading indicator in the Update Location Request message shows that it is necessary to download user subscription data and the Update Location Request message carries capability information of the requesting node, but there is no supported user subscription data (in other words, the requesting node does not support user subscription data which should be supported in the view of the HSS), then the HSS returns an Update Location Ack message to the requesting node, wherein the Update Location Ack message includes a processing result of refusal and a cause value thereof.

If the user subscription data downloading indicator shows that it is necessary to download user subscription data and the Update Location Request message transmitted from the requesting node to the user's HSS does not carry capability information of the requesting node, then the HSS defaults that the requesting node supports all user subscription data, and returns all user subscription data to the requesting node.

The present invention will be further described in conjunction with a specific application example in the following.

Figure 5:
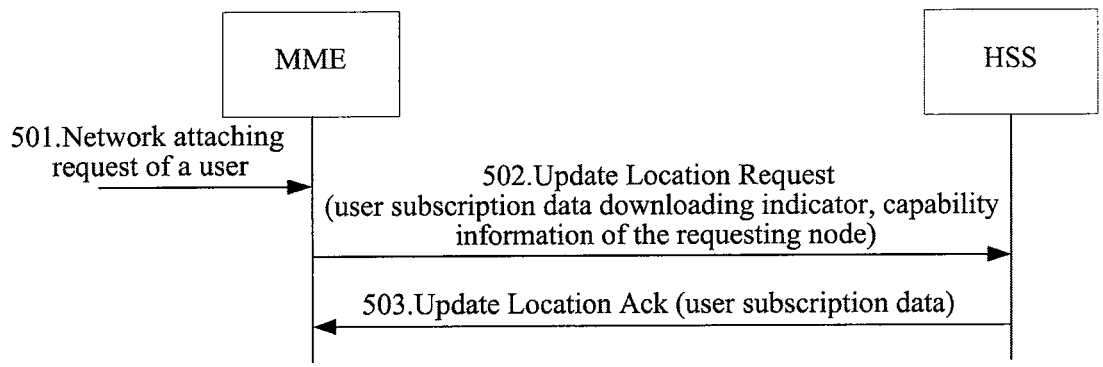
FIG. 5 shows a flow of a user registering to a HSS through a MME in a packet switched domain according to an application example of the present invention.

FIG. 5 shows a flow of a user registering to a HSS through a MME in a packet switched domain according to an application example of the present invention, comprising the following steps:

Step 501, a user originating a network attaching request to a visited domain network when accessing through an E-UTRAN;

Step 502: after receiving the network attaching request, a MME detecting that the user is initially attached to the network and the MME has no user data information, the MME configuring a user subscription data downloading indicator and originating an Update Location Request message based on Diameter network protocol to the user's HSS, wherein the Update Location Request message carries the user subscription data downloading indicator and capability information of the MME, for example, ODB data, regional subscription data, etc.

Step 503, after receiving the Update Location Request message from the MME, the user's HSS checks validity of the user: if check fails or user roaming is not allowed, the HSS returning an Update Location Ack message to the MME, wherein the Update Location Ack message includes a processing result of refusal and its cause value; if check is passed and the user is allowed to roam in the visited network, the HSS judges the user subscription data downloading indicator carried in the Update Location Request message, and executing the following processing:

If the user subscription data downloading indicator in the Update Location Request message requests to download user subscription data and includes capability information of the MME, the HSS checks the capability information of the MME carried in the Update Location Request message and returns an Update Location Ack message to the MME, wherein the Update Location Ack message includes a processing result of success, and user subscription data supported by the MME, for example, ODB data, regional subscription data, etc.

If the user subscription data downloading indicator in the Update Location Request message requests to download user subscription data and the Update Location Request message does not carry capability information of the MME, then the HSS defaults that the MME supports all user subscription data and returns all of the user subscription data to the MME.

If the user subscription data downloading indicator in the Update Location Request message requests to download user subscription data and the Update Location Request message carries capability information of the MME, but there is no supported user subscription data (in other words, the MME does not support user subscription data which should be supported in view of the HSS), then the HSS returns an Update Location Ack message to the MME, wherein the Update Location Ack message includes a processing result of refusal and a cause value thereof.

If the user subscription data downloading indicator in the Update Location Request message does not request to download user subscription data, then the HSS returns an Update Location Ack message to the MME, wherein the Update Location Ack message includes a processing result of success but does not include user subscription data.

The present invention is described with reference to specific examples. However a person having ordinary skill in the art may make modifications and variations without departing from the spirit or scope of the present invention. Such modifications and variations will be deemed as within the scope of the present invention and the scope of the appended claims.

Industrial Applicability

The present invention provides a method for implementing user registration based on Diameter network protocol, in which only one signaling interaction is required to implement registration of user location information, downloading and verification/negotiation of user data between a network node and a HSS by carrying capability information of a requesting node in a request message, thereby completing user registration.

What I claim is:

1. A method for implementing user registration, comprising:

after receiving a network attaching request of a user, a requesting node sending an Update Location Request message to a Home Subscriber Server (HSS) of the user, wherein the message includes information indicating it is necessary to download user subscription data, and also includes capability information indicating which user subscription data is supported or not supported by the requesting node; and upon receiving the Update Location Request message, the HSS of the user returning a Update Location Ack acknowledgement message to the requesting node if the check of the user is passed; the HSS determining the user subscription data supported by the requesting node according to the capability information, and including the user subscription data supported by the requesting node in the Update Location Ack message to be returned to the requesting node, wherein the requesting node is a Mobility Management Entity (MME), and the user registration is implemented based on Diameter network protocol.

2. The method according to claim 1, wherein, the capability information of the requesting node comprises an assemble of features of services supported by the node, including Operator Determined Barring (ODB) data, and regional subscription data.

3. The method according to claim 1, wherein, the information indicating it is necessary to download user subscription data is a user subscription data downloading indicator.

4. The method according to claim 3, further comprising after the requesting node receives the network attaching request of the user:

the requesting node detecting location information registered by the user and user data information, judging whether to download the user subscription data according to the detection result, and correspondingly configuring the user subscription data downloading indicator.

5. The method according to claim 3, wherein, if the user subscription data downloading indicator in the Update Location Request message received by the HSS shows that it is necessary to download user subscription data and the Update Location Request message carries capability information of the requesting node, but the requesting node does not support user subscription data which should be supported in view of the HSS, then the HSS includes a processing result of refusal and a cause value thereof in the Update Location Ack message.

* * * * *

UNITED STATES PATENT AND TRADEMARK OFFICE
CERTIFICATE OF CORRECTION

PATENT NO. : 8,671,161 B2
APPLICATION NO. : 12/935087
DATED : March 11, 2014
INVENTOR(S) : Zhaoming Ding It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 222 days.

Signed and Sealed this
Twenty-ninth Day of September, 2015

Michelle K. Lee
*Director of the United States Patent and Trademark Office*